(12) United States Patent
Bolshakov et al.

(10) Patent No.: US 8,880,348 B2
(45) Date of Patent: Nov. 4, 2014

(54) RADON MIGRATION OF ACOUSTIC DATA

(75) Inventors: Alexei Bolshakov, Pearland, TX (US);
Xiao Ming Tang, Sugar Land, TX (US);
Douglas J. Patterson, Spring, TX (US);
Vladimir Dubinsky, Houston, TX (US);
Zarema Dubinsky, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 321 days.

(21) Appl. No.: 13/237,526

(22) Filed: Sep. 20, 2011

(65) Prior Publication Data
US 2012/0109528 A1 May 3, 2012

(51) Int. Cl.
*G01V 1/50* (2006.01)
*G01V 1/28* (2006.01)
*E21B 47/00* (2012.01)
*E21B 47/10* (2012.01)

(52) U.S. Cl.
CPC .............. *G01V 1/28* (2013.01); *G01V 2210/40* (2013.01); *G01V 2210/244* (2013.01); *G01V 2210/46* (2013.01); *G01V 2210/51* (2013.01); *E21B 47/0002* (2013.01); *E21B 47/101* (2013.01)
USPC ............................................. 702/9; 702/11

(58) Field of Classification Search
CPC ................... G01R 22/063; G01V 2210/1299; G01V 2210/1429; G01V 2210/40; G01V 2210/161; G01V 11/005
USPC ............................................................ 702/9
See application file for complete search history.

(56) References Cited

U.S. PATENT DOCUMENTS

| 4,760,563 | A | 7/1988 | Beylkin |
|---|---|---|---|
| 6,691,039 | B1 | 2/2004 | Wood |
| 6,721,662 | B2 | 4/2004 | Wood |
| 2004/0049349 | A1* | 3/2004 | Wood .............................. 702/17 |
| 2004/0158997 | A1* | 8/2004 | Tang .............................. 33/304 |
| 2008/0247272 | A1 | 10/2008 | Pan |
| 2009/0180351 | A1* | 7/2009 | Paffenholz et al. ............. 367/38 |
| 2009/0248313 | A1 | 10/2009 | Berkovitch et al. |

OTHER PUBLICATIONS

Notification of Transmittal of the International Search Report and the Written Opinion of the International Searching Authority, or the Declaration; PCT/US2011/052552; Apr. 26, 2012.
Press, William H., Discrete radon transform has an exact, fast inverse and generalizes to operations other than sums along lines, Oct. 2006, 1-17, Los Alamos National Laboratory.
Tang, et al. "Processing acoustic-logging data to image near-borehole geologic structures", Geophysics, vol. 72, No. 2, SEG/New Orleans 2006 Annual Meeting pp. 339-343.

* cited by examiner

*Primary Examiner* — John Breene
*Assistant Examiner* — Timothy H Hwang
(74) *Attorney, Agent, or Firm* — Cantor Colburn LLP

(57) ABSTRACT

Disclosed is a method implemented by a processor for imaging a formation penetrated by a borehole. The method includes: obtaining acoustic data in a depth-time domain using an acoustic downhole tool disposed at a depth in the borehole, the acoustic downhole tool having an acoustic source and an acoustic receiver; transforming the acoustic data in the depth-time domain into a Radon domain using a Radon transform; filtering the acoustic data in the Radon domain to increase a signal of interest in the acoustic data in the Radon domain; determining a location of a point in the formation that reflected acoustic energy emitted from the acoustic source to the acoustic receiver, the location of the point being represented in the Radon domain; and inverting the location of the point represented in the Radon domain into a radius-depth domain to image the formation.

19 Claims, 6 Drawing Sheets

RADON MIGRATION OF ACOUSTIC DATA

CROSS REFERENCE TO RELATED APPLICATIONS

This application claims the benefit of U.S. Application No. 61/385,062, filed on Sep. 21, 2010, which is incorporated herein by reference in its entirety.

BACKGROUND

1. Field of the Invention

The invention disclosed herein relates to imaging a geologic formation with an acoustic logging tool.

2. Description of the Related Art

Geologic formations are of interest for a variety of reasons such as hydrocarbon production, geothermal production, and carbon dioxide sequestration. One way to obtain information about geologic formations is by using an acoustic logging tool.

The acoustic logging tool is conveyed through a borehole penetrating the earth. The tool emits acoustic energy into a formation and receives acoustic energy that is reflected by the formation back to the tool. With knowledge about the emitted acoustic energy and the reflected acoustic energy, properties of the formation can be estimated. Several factors though, such as noise, can make the acoustic data difficult to interpret. It would be well received in the drilling industry if the interpretation of acoustic data could be improved.

BRIEF SUMMARY

Disclosed is a method implemented by a processor for imaging a formation penetrated by a borehole. The method includes: obtaining acoustic data in a depth-time domain using an acoustic downhole tool disposed at a depth in the borehole, the acoustic downhole tool comprising an acoustic source and an acoustic receiver; transforming the acoustic data in the depth-time domain into a Radon domain using a Radon transform; filtering the acoustic data in the Radon domain to increase a signal of interest in the acoustic data in the Radon domain; determining a location of a point in the formation that reflected acoustic energy emitted from the acoustic source to the acoustic receiver, the location of the point being represented in the Radon domain; and inverting the location of the point represented in the Radon domain into a radius-depth, r-z, domain to image the formation, the depth being a distance into the borehole and the radius being a radial distance from the borehole.

Also disclosed is an apparatus for imaging a formation penetrated by a borehole. The apparatus includes: an acoustic downhole tool configured to be disposed in the borehole. The tool includes an acoustic source configured to emit acoustic energy into the formation and an acoustic receiver configured to receive acoustic energy reflected by the formation and a processor coupled to the downhole tool and configured to implement a formation imaging method. The formation imaging method includes: obtaining acoustic data in a depth-time domain from the acoustic downhole tool disposed at a depth in the borehole; transforming the acoustic data in the depth-time domain into a Radon domain using a Radon transform; filtering the acoustic data in the Radon domain to increase a signal of interest in the acoustic data in the Radon domain; determining a location of a point in the formation that reflected acoustic energy emitted from the acoustic source to the acoustic receiver, the location of the point being represented in the Radon domain; and inverting the location of the point represented in the Radon domain into a radius-depth, r-z, domain to image the formation, the depth being a distance into the borehole and the radius being a radial distance from the borehole.

Further disclosed is a non-transitory computer-readable medium having computer-executable instructions for imaging a formation penetrated by a borehole by implementing a formation imaging method. The formation imaging method includes: obtaining acoustic data in a depth-time domain from an acoustic downhole tool disposed at a depth in the borehole, the acoustic downhole tool comprising an acoustic source and an acoustic receiver; transforming the acoustic data in the depth-time domain into a Radon domain using a Radon transform; filtering the acoustic data in the Radon domain to increase a signal of interest in the acoustic data in the Radon domain; determining a location of a point in the formation that reflected acoustic energy emitted from the acoustic source to the acoustic receiver, the location of the point being represented in the Radon domain; and inverting the location of the point represented in the Radon domain into a radius-depth, r-z, domain to image the formation, the depth being a distance into the borehole and the radius being a radial distance from the borehole.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
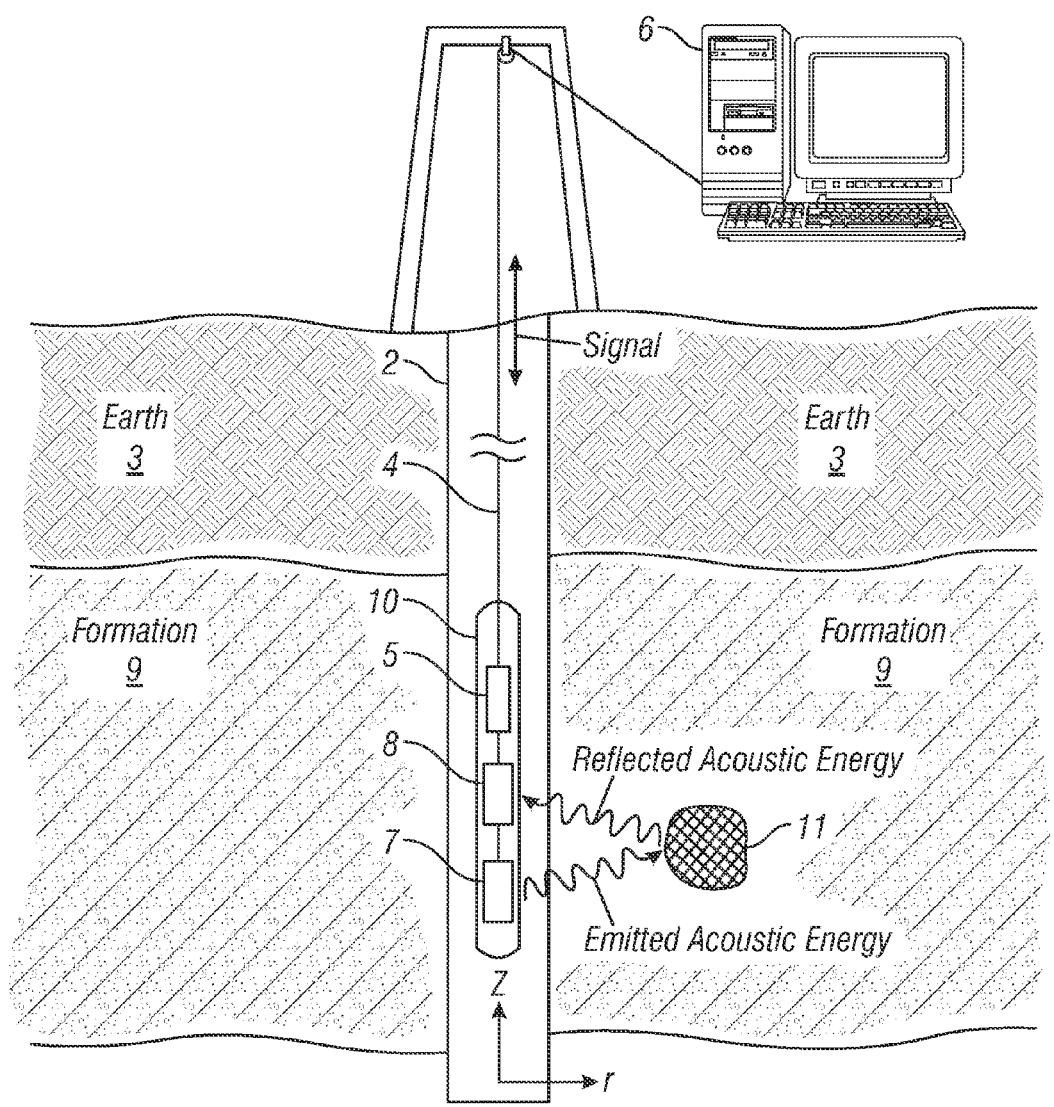
FIG. 1 illustrates an exemplary embodiment of a downhole acoustic tool disposed in a borehole penetrating the earth.

FIG. 1 illustrates an exemplary embodiment of an acoustic downhole tool 10 disposed in a borehole 2 penetrating the earth 3, which includes an earth formation 9. The earth formation 19 includes any subsurface materials that may be of interest. Included in the earth formation 9 is a subsurface feature 11. The feature 11 has acoustic properties that differ from the surrounding formation 9. Because of the different acoustic properties, the boundary defining the feature 11 can reflect acoustic energy such as acoustic waves.

The acoustic downhole tool 10 is conveyed through the borehole 2 by a carrier 4. In the embodiment of FIG. 1, the carrier 4 is an armored wireline. Besides supporting the downhole tool 10 in the borehole 2, the wireline can also provide communications between the downhole tool 10 and a surface computer processing system 6 disposed at the surface of the earth 3. In logging-while-drilling (LWD) or measurement-while-drilling (MWD) embodiments, the carrier 4 can be a drill tubular such as a drill string or coiled tubing. In order to operate the downhole tool 10, process data, and/or provide a communications interface with the surface computer processing system 6, the acoustic downhole tool 10 includes downhole electronics 5. Data processing functions can be performed by the downhole electronics 5, the surface computer processing system 6 or combination thereof.

Still referring to FIG. 1, the acoustic downhole tool 10 includes an acoustic source 7 that is configured to emit acoustic energy into the formation 9. In addition to the acoustic source 7, the acoustic downhole tool 10 includes an acoustic receiver 8 that is configured to receive acoustic energy such as the acoustic energy that is reflected by the formation 9. While FIG. 1 depicts one acoustic source 7 and one acoustic receiver 8, the acoustic downhole tool 10 can include more than one acoustic source 7 and/or acoustic receiver 8. In one or more embodiments, the acoustic source 7 is a first transducer configured to convert electrical energy (or signal) received from the downhole electronics 5 into acoustic energy. In one or more embodiments, the acoustic receiver 8 is a second transducer configured to convert received acoustic energy into electrical energy (or signal) that is transmitted to the downhole electronics 5 for processing or transmission to the surface computer processing system 6.

The acoustic energy returned or reflected from the formation 9 resulting from the acoustic energy emitted by the acoustic source 7 is received by the acoustic receiver 8. The received acoustic energy (or signal) is provided as data for processing by the downhole electronics 5 and/or the surface computer processing system 6. Processed data is then used to generate an image of the formation 9 and, in particular, an image of a boundary of the feature 11 using techniques presented below.

In general, the acoustic downhole tool 10 performs acoustic measurements at different depths in the borehole 2 to acquire waveforms w(z, t), where z is the depth of the position of the acoustic receiver 8 and t is time. The waveforms w(z, t) are then transformed using the Radon transform, as shown in Equation (1), into the p-tau domain.

$$\tilde{w}(p,\tau) = \int w(z,\tau+pz)dz \quad (1)$$

Representation of the waveform data in the p-tau domain (($\tilde{w}(p, \tau)$)) provides an opportunity to "filter" or process the waveform data for certain values of p or τ and then bring the Radon transformed data back into the depth-time (z, t) domain using the inverse formula shown in Equation (2).

$$w_f(r,z) = \text{rho}(\int \tilde{w}_f(p,t-pz)dp) \quad (2)$$

In Equation (2), $\tilde{w}_f$ represents the waveform data that is filtered in the tau-p (Radon) domain, $\tilde{w}_f$ represents the inverse Radon transform of the waveform data, and rho( ) represents a rho filter, as known in the art, to correct amplitude distortions.

Filtering in the p-tau (Radon) domain can include, but not be limited by, the following three filtering techniques. In a first filtering technique, the expression for $\tilde{w}(p, \tau)$ can be set to "0" for certain ranges of p, which represent direct arrivals of waveforms (through formation, borehole fluid, or tool and not reflections from the formation), to suppress those waveform arrivals, and to stress waveform arrivals from different acoustic boundaries. In a second technique, "threshold" filtering is used to remove noise components in the waveforms. In a third technique, a frequency filter can be applied to tau (t) at each fixed p to enhance or bring out a signal of a certain frequency. In addition, filtering in the p-tau (Radon) domain can also be used to filter from the received waveforms artifacts attributed to use of the acoustic downhole tool 10. Using of any or all of the filtering techniques results in an increase in the signal-to-noise (SNR) ratio of the filtered waveforms. When used for imaging, the higher SNR waveforms result in clearer more defined images.

Figure 2:
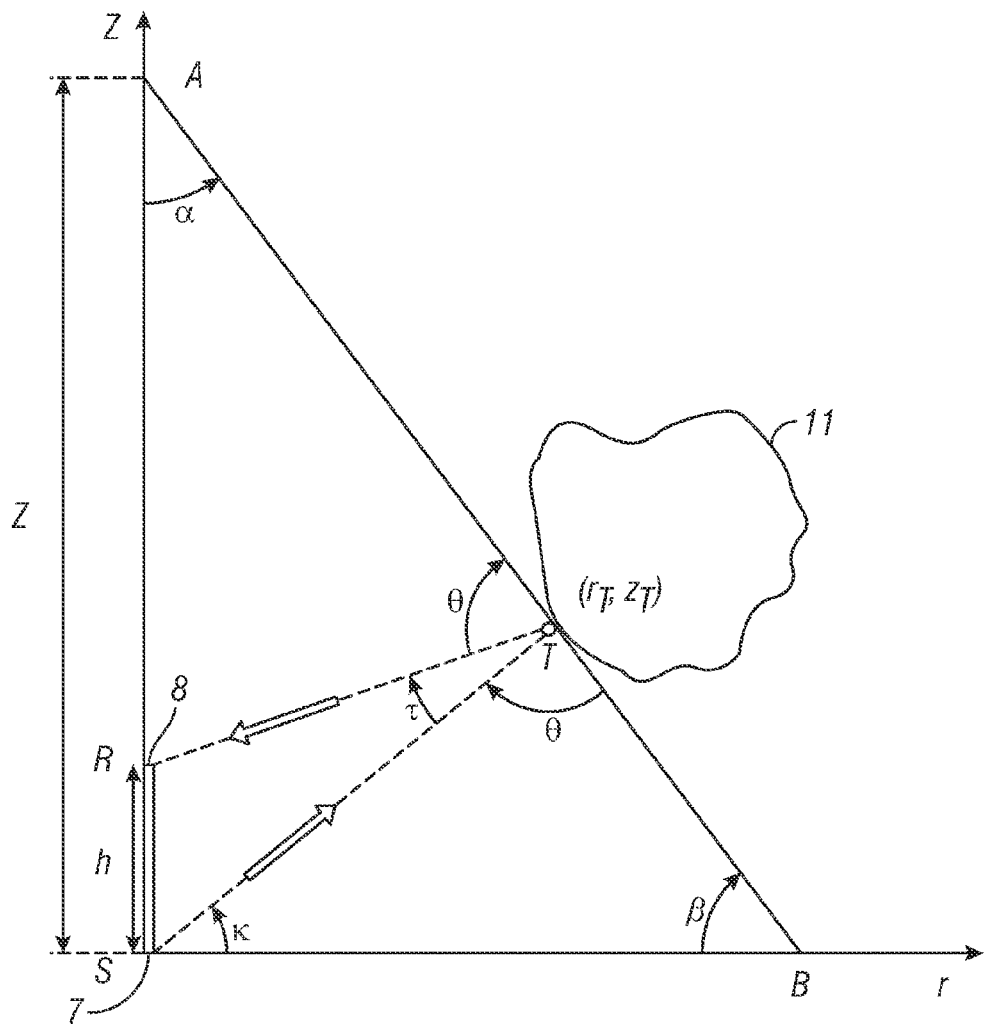
FIG. 2 depicts aspects of imaging a feature in an earth formation.

Radon migration, which relates to imaging of the formation 9 is discussed next. Reference may now be had to FIG. 2, which schematically shows imaging of the point T($r_T$, $z_T$) on a boundary of the feature 11 in the formation 9 using acoustic reflection. It can be appreciated that by imaging several points along the boundary of the feature 11, an image of the feature 11 can be obtained.

The borehole 2 is aligned along the z-axis, the acoustic source 7 is at (0, 0), and the acoustic receiver 8 is at (0, h). The line AB is tangent to the point T($r_T$, $z_T$) and β is the angle between the tangent line AB and axis r. In order for the reflection of acoustic energy to be received by the acoustic receiver 8 in the configuration of FIG. 2, the angles RTA and STB should be about equal:

$$\theta = \angle RTA = \angle STB \quad (3)$$

Using Equation (3) and other geometrical and optical considerations for the configuration depicted in FIG. 2, Equations (4), (5) and (6) can be derived.

$$\tan\beta = -\frac{z_T}{r_T} + \frac{h}{r_T} \frac{r_T^2 + z_T^2}{r_T r_T^2 + z_T^2 - \sqrt{r_T^2 + z_T^2}\sqrt{r_T^2 + (z_T-h)^2}} \quad (4)$$

$$p = \frac{2(2z_T + 2r_T\tan\beta - h)}{V\sqrt{\frac{h^2(1+\tan^2\beta) + 4(z_T + r_T\tan\beta)}{(z_T + r_T\tan\beta - h)}}\sqrt{1+\tan^2\beta}} \quad (5)$$

$$t = \frac{\sqrt{r_T^2 + z_T^2} + \sqrt{r_T^2 + (z_T-h)^2}}{V} - p(z_T - h/2) \quad (6)$$

In Equations (4), (5) and (6), V is the average velocity of acoustic waves in the formation 9 between the point T and the acoustic receiver 8. For a given $r_T$, p, h (distance between the acoustic source 7 and the acoustic receiver 8) and V, Equations (3) and (4) can be used to find $z_T$ (which serves in this case as a parameter of the point T on the boundary of the feature 11). This substitution can be used to migrate data obtained from the acoustic receiver 8 from the p-tau (Radon) domain to the (r, z) domain with the use of Equation (7), where r is a radial distance from the borehole 2 and z is a distance along the borehole 2.

$$Im(r,z) = \text{rho}(\int \tilde{w}(p,t(r,p)-pz)dp) \quad (7)$$

Note that Equation (7) provides a map of acoustic boundaries of the feature 11 in the formation 9 where rho( ) is the rho filter.

Equations (4) through (6) are not the only equations that can be substituted into Equation (7) to obtain an image of the feature 11 in the formation 9. For example, Nanxun Dai suggests using Equations (8) through (10) to determine t(r, p).

$$t(r, p) = -pb + \frac{2}{V} \times \left(A - \frac{r}{\sqrt{1-p^2V^2/4}}\right) + \frac{2r}{V} \times \sqrt{1-p^2V^2/4} \quad (8)$$

where $$A^2 = \frac{r^2}{2(1-p^2V^2/4)} \times \left(1 + \sqrt{1 + \frac{h^2V^2p^2}{4r^2}(1-p^2V^2/4)}\right) + \frac{h^2}{4} \quad (9)$$

and $$b = \frac{rh^2pV}{8(A^2 - h^2/4)\sqrt{1-p^2V^2/4}} \quad (10)$$

FIG. 3 compares the "time" obtained for Radon migration of data using Dai's equations (8-10) and using "exact" equations (4-6) for source-receiver distance h=10 feet and different values of pV (where p is the slowness in the p-tau (Radon) domain for a single acoustic receiver and V is the average velocity of acoustic waves in the formation 9 between the point T and the acoustic receiver 8). For p=0 (pV=0, i.e., boundary is parallel to the borehole 2), both the Dai's equations and the exact equations give the same results (not shown here). As pV increases (i.e., angle of the boundary, α, as shown in FIG. 2, increases), the Dai's equations and the exact equations yield different results near the borehole 2—the difference increases as the value of pV increases. For large radial distances both the Dai's equations and the exact equations converge to the same value.

Figure 3A:
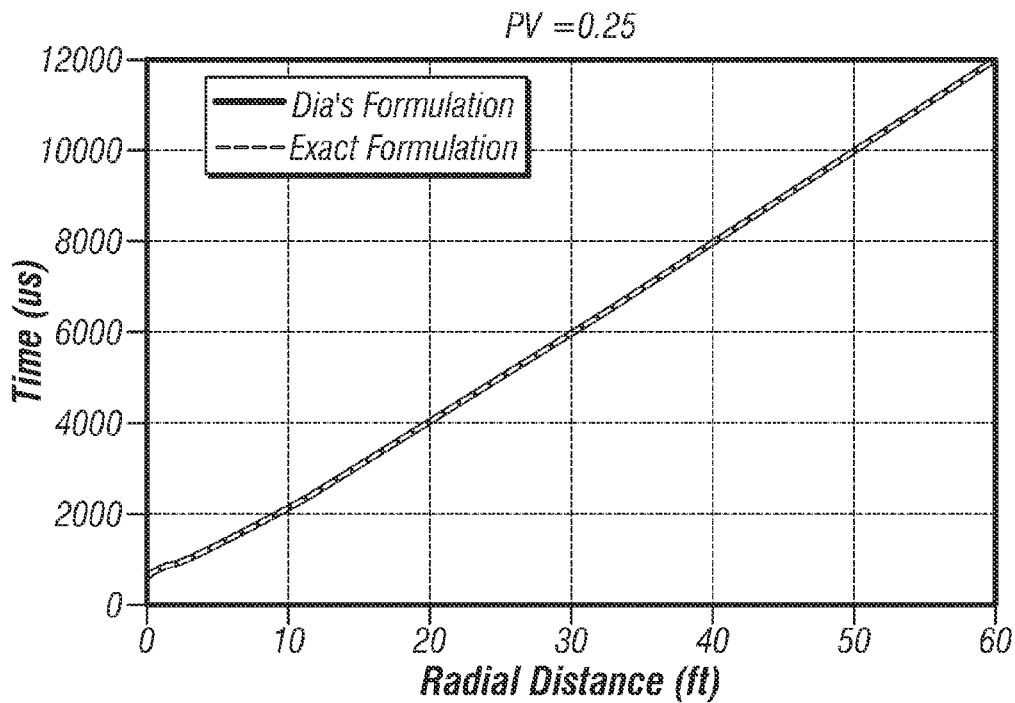
FIGS. 3A, 3B, 3C, 3D, and 3E, collectively referred to as FIG. 3 depicts comparisons of Dai's formulation with an exact formulation.
Figure 3B:
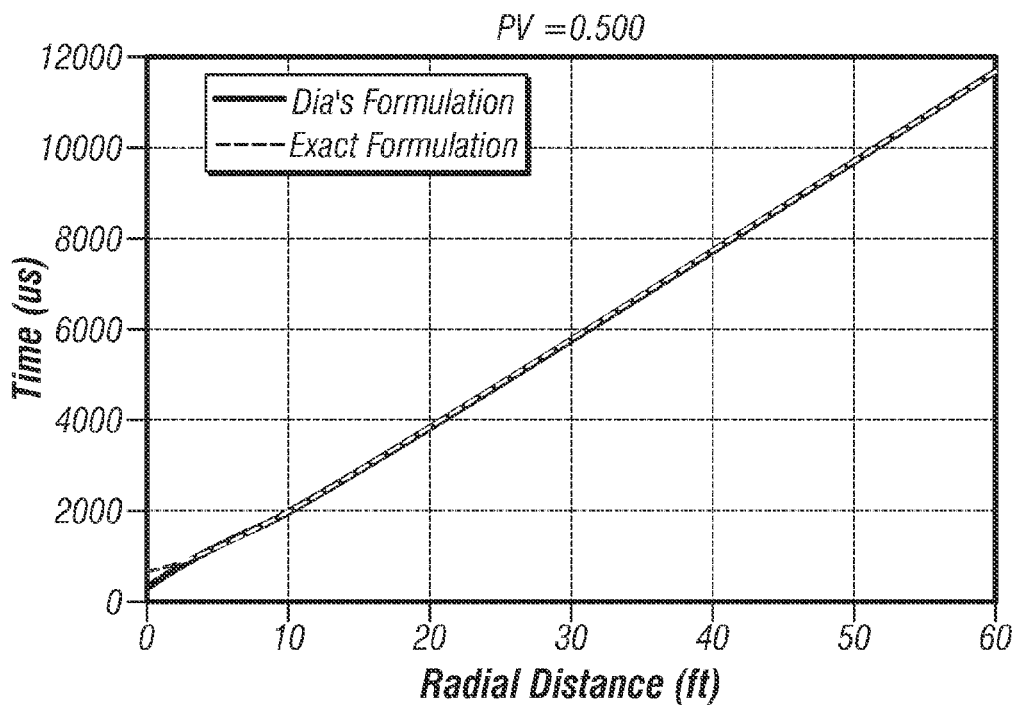
Figure 3C:
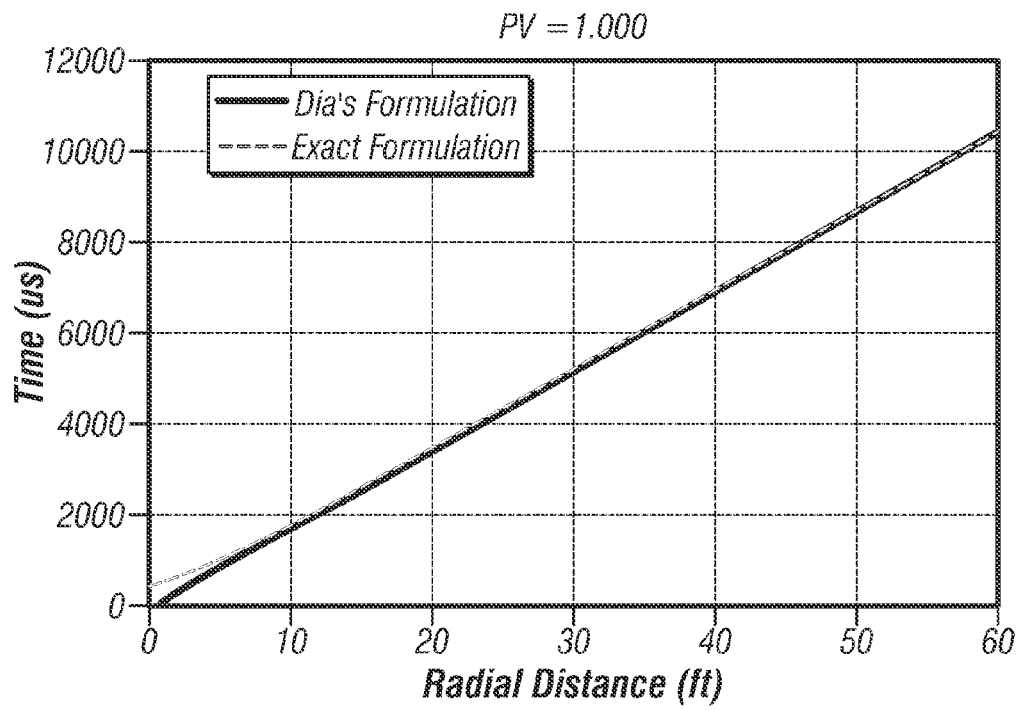
Figure 3D:
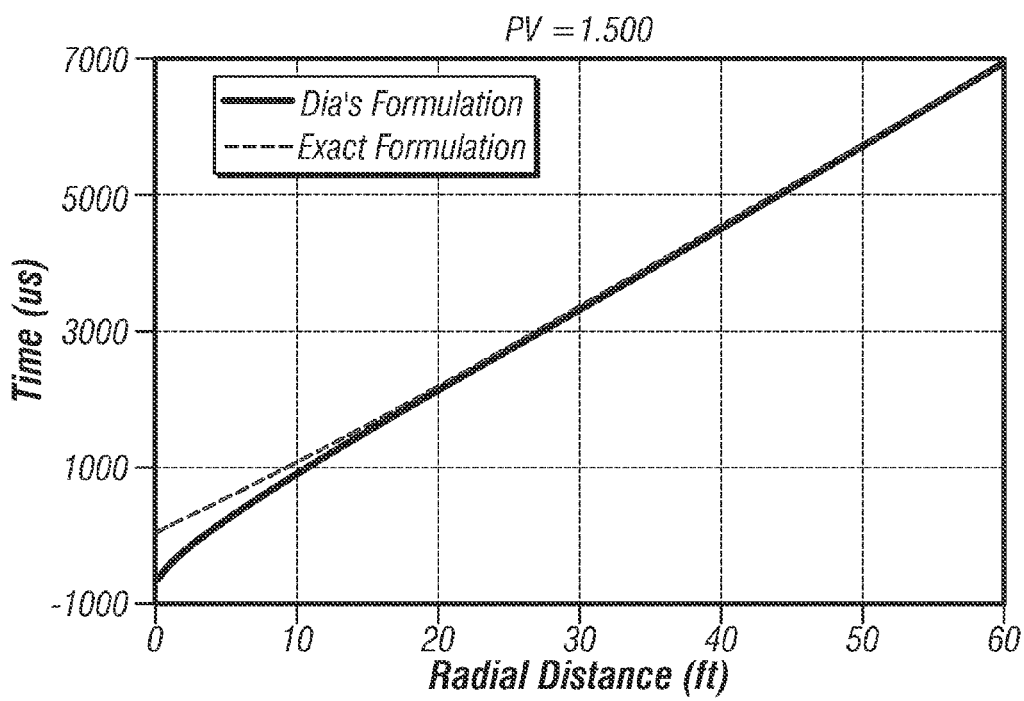
Figure 3E:
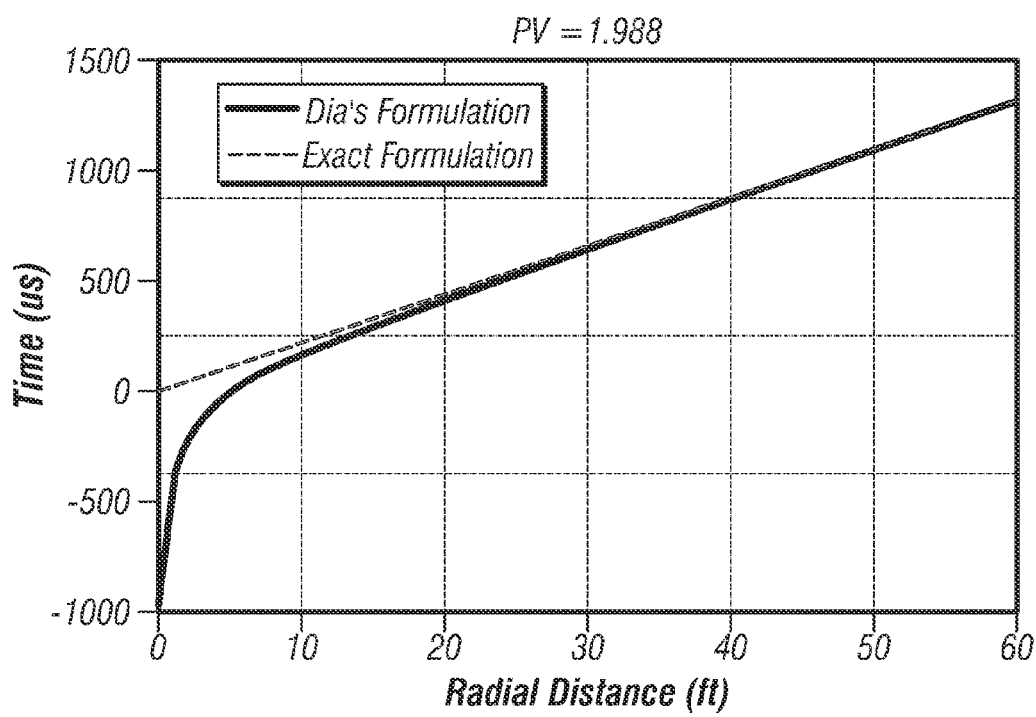

For FIG. 3A, pV is 0.250. For FIG. 3B, pV is 0.500. For FIG. 3C, pV is 1.000. For FIG. 3D, pV is 1.500. And, for FIG. 3E, pV is 1.988. All five plots show convergence as the radial distance from the borehole 2 increases.

Figure 4:
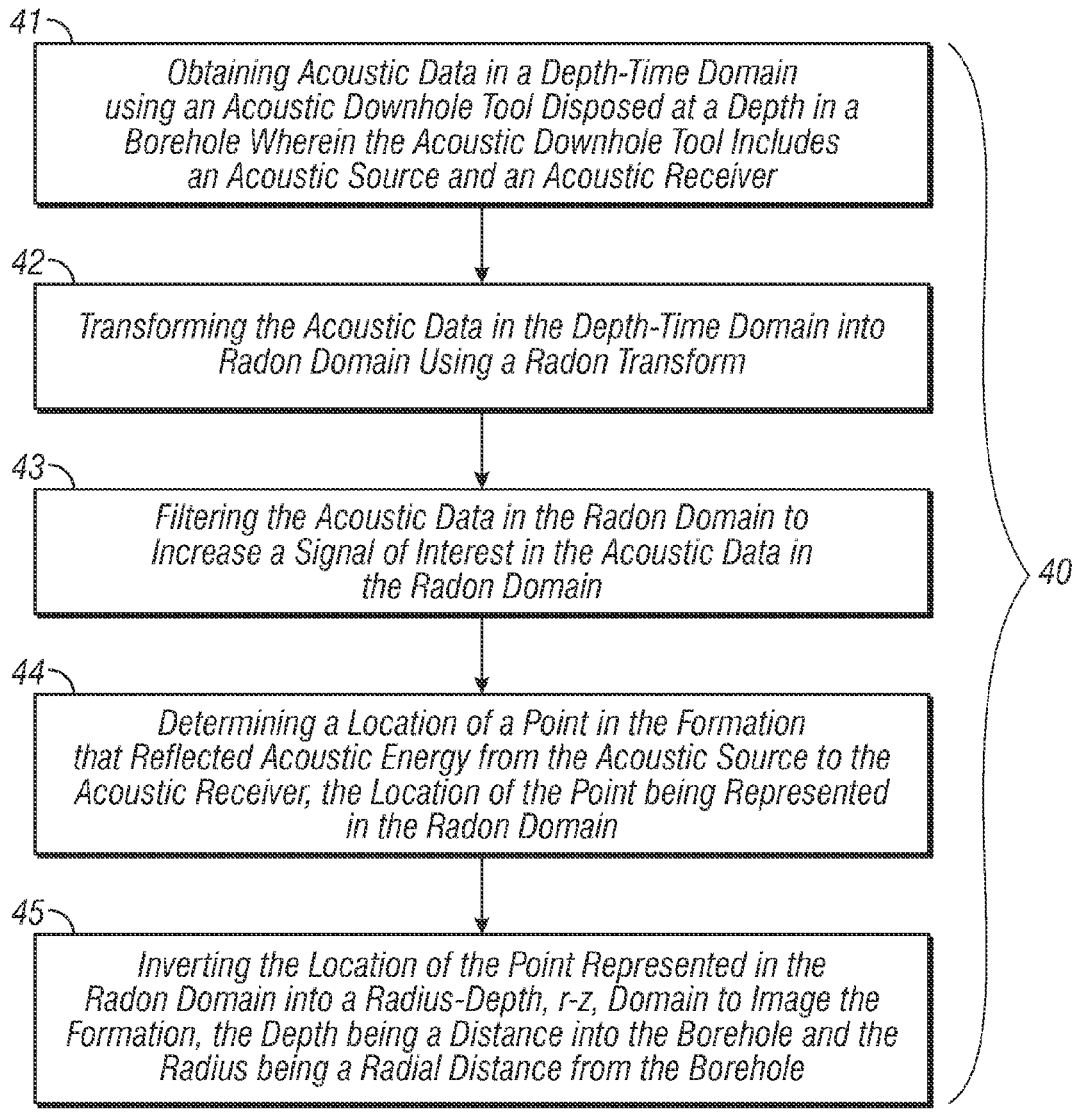
FIG. 4 presents one example of a method for imaging the feature.

FIG. 4 presents one example of a method 40 implemented by a processor for imaging a formation penetrated by a borehole. The method 40 calls for (step 41) obtaining acoustic data in a depth-time domain using an acoustic downhole tool disposed in the borehole. The acoustic downhole tool includes an acoustic source and an acoustic receiver. Further, the method 40 calls for (step 42) transforming the acoustic data into a Radon domain using a Radon transform. Non-limiting examples of the Radon domain include the p-tau domain or the DRT domain as discussed further below. Further, the method 40 calls for (step 43) filtering the acoustic data in the Radon domain to increase a signal of interest in the acoustic data in the Radon domain. Further, the method 40 calls for (step 44) determining a location of a point in the formation that reflected acoustic energy from the acoustic source to the acoustic receiver, the location of the point being represented in the Radon domain. Further, the method 40 calls for (step 45) inverting the location of the point represented in the Radon domain into a radius-depth, r-z, domain to image the formation. The depth being a distance into the borehole and the radius being a radial distance from the borehole.

It can be appreciated that the data in the depth-time domain can be transformed into domains other than the p-tau domain for filtering and processing using transforms other than the Radon transform discussed above. One other transform is the Discrete Radon Transform (DRT), proposed by Gotz and Druckmüller and independently by Brady, which is known the art of computer tomography and related medical imaging technologies. In order to inversely transform data that was transformed using the DRT, an inverse DRT may be used, which provides an "exact" inversion of DRT data. Alternatively, Fourier methods may be used to invert the DRT data and provide an approximate inverse.

In the DRT, an image is represented as an N×N array of intensity values. A set of digital lines is defined that transect the image, passing exactly through one array point in each column of the array and parameterized by integers. The DRT is defined as the sum of the image intensities over array points on a digital line. The image data transformed by the DRT is transformed into a DRT domain.

There are several advantages to using the DRT. The DRT is fast with speed comparable to the Fast Fourier Transform (FFT). No resampling of a signal is needed to produce the sums along different digital lines when using the DRT, while resampling may be necessary when using the Radon or p-tau transform discussed above. The DRT automatically covers lines at all possible angles that cross the "waveform" image domain (i.e., image array). This is very important because the angle of possible reflectors/reflections may not be known a priory. In the case of the p-tau domain, the user may need to specify certain parameters to gain the most efficient coverage of certain "angles of interest."

Another advantage of using the DRT is that the DRT has an "exact" inverse. That is the inverse DRT is a fast efficient method that gains the exact image from the DRT domain. In addition, the DRT provides for fast efficient processing with operations different from "summation" of the image intensities such that any associative and commutative operation can serve instead of addition. For example, a median or other property of the distribution function along the digital lines can be computed to provide a discrete median Radon transform. A "semblance" filter similar to "semblance" used in acoustics can also be incorporated into the DRT. All of the filtering techniques discussed above with respect to the Radon transform are also readily applicable to operations in the DRT domain as well.

It can be appreciated that the processing techniques disclosed above can be implemented with acoustic reflection data acquired from more than one acoustic receiver 8 and/or acoustic energy emitted into the formation 9 from more than one acoustic source 7.

It can be appreciated that the processing techniques disclosed above can be implemented in conjunction with other processing techniques. Non-limiting examples of the other processing techniques include converting multiple-component acoustic data into single component acoustic data, deconvolution of the acoustic receiver data, attenuation (Q) compensation of acoustic receiver data, inverse Q filtering of acoustic receiver data, and stacking of acoustic receiver data. In addition, an azimuth associated with the acoustic receiver data can be estimated. The processing techniques for estimating the azimuth include, for example, inputting multiple-component acoustic receiver data from an array of acoustic receivers, dividing the acoustic receiver data into multiple zones, selecting an angle to rotate the multiple-component acoustic receiver data, visualizing the rotated data, determining if cross-components are at a minimum, and outputting an angle at which the cross-components are at the minimum.

It can be appreciated that advantages of the method and apparatus disclosed herein include providing images of subsurface materials and especially features in the subsurface materials with improved resolution and clarity of the materials and features in the images.

In support of the teachings herein, various analysis components may be used, including a digital and/or an analog system. For example, the downhole electronics 5 or the surface computer processing 6 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to a component being either directly coupled to another component or indirectly coupled via an intermediate component.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A method for imaging a formation penetrated by a borehole, the method comprising:
    obtaining acoustic data in a depth-time domain using an acoustic downhole tool disposed at a depth in the borehole, the acoustic downhole tool comprising an acoustic source and an acoustic receiver;
    transforming, by a processor, the acoustic data having waveform $w(z,t)$ where z is a depth of the acoustic receiver and t is time in the depth-time domain into a Radon domain $\tilde{w}(p,\tau)$ that is a function of p and tau ($\tau$) using a Radon transform where $\tilde{w}(p,\tau)=\int w(z,\tau+pz)dz$;
    filtering, by a processor, the acoustic data in the Radon domain to increase a signal of interest in the acoustic data in the Radon domain by removing unwanted signals in the Radon domain;
    determining, by a processor, a location of a point in the formation that reflected acoustic energy emitted from the acoustic source to the acoustic receiver, the location of the point being represented in the Radon domain; and
    inverting, by a processor, the location of the point represented in the Radon domain into a radius-depth, r-z, domain to image the formation, the depth being a distance into the borehole and the radius being a radial distance from the borehole.

2. The method according to claim 1, further comprising imaging boundaries of a feature in the formation.

3. The method according to claim 1, wherein filtering comprises setting the acoustic data in the Radon domain to zero for certain ranges of p that represent direct arrivals of the acoustic waves through the formation, a borehole fluid or the downhole tool in order to filter out reflections not related to the formation.

4. The method according to claim 1, wherein filtering comprises filtering out noise components from the acoustic data in the Radon domain.

5. The method according to claim 1, wherein filtering comprises applying a frequency filter to tau for each fixed p to the acoustic data in the Radon domain in order to enhance a signal of a certain frequency.

6. The method according to claim 1, wherein filtering comprises filtering out waveform artifacts from the acoustic data in the Radon domain attributed to the downhole acoustic tool and not to the formation.

7. The method according to claim 1, wherein the Radon transform is a discrete Radon transform (DRT) and the Radon domain is a discrete Radon domain.

8. An apparatus for imaging a formation penetrated by a borehole, the apparatus comprising:
    an acoustic downhole tool configured to be disposed in the borehole, the tool comprising an acoustic source configured to emit acoustic energy into the formation and an acoustic receiver configured to receive acoustic energy reflected by the formation; and
    a processor coupled to the downhole tool and configured to implement a method comprising:
    obtaining acoustic data in a depth-time domain from the acoustic downhole tool disposed at a depth in the borehole;
    transforming the acoustic data having waveform $w(z,t)$ where z is a depth of the acoustic receiver and t is time in the depth-time domain into a Radon domain $\tilde{w}(p,\tau)$ that is a function of p and tau ($\tau$) using a Radon transform where $\tilde{w}(p,\tau)=\int w(z,\tau+pz)dz$;
    filtering the acoustic data in the Radon domain to increase a signal of interest in the acoustic data in the Radon domain by removing unwanted signals in the Radon domain;
    determining a location of a point in the formation that reflected acoustic energy emitted from the acoustic source to the acoustic receiver, the location of the point being represented in the Radon domain; and
    inverting the location of the point represented in the Radon domain into a radius-depth, r-z, domain to image the formation, the depth being a distance into the borehole and the radius being a radial distance from the borehole.

9. The apparatus according to claim 8, wherein an image of the formation comprises boundaries of a feature in the formation.

10. The apparatus according to claim 8, wherein the Radon domain is a p-tau domain.

11. The apparatus according to claim 8, wherein the Radon transform is a discrete Radon transform (DRT) and the Radon domain is a discrete Radon domain.

12. The apparatus according to claim 8, wherein the acoustic downhole tool is coupled to a carrier configured to convey the tool through the borehole.

13. The apparatus according to claim 12, wherein the carrier comprises a wireline, a drill string, or coiled tubing.

14. The apparatus according to claim 8, wherein the acoustic source comprises a transducer configured to convert electrical energy to acoustic energy and the acoustic receiver comprises a transducer configured to convert acoustic energy to electrical energy.

15. The apparatus according to claim 8, further comprising downhole electronics coupled to the acoustic source and the acoustic receiver.

16. The apparatus according to claim 8, wherein the processor is disposed at the acoustic downhole tool or at the surface of the earth.

17. A non-transitory computer-readable medium comprising computer-executable instructions for imaging a formation penetrated by a borehole, when executed by a computer, cause the computer to implement a method comprising:
    obtaining acoustic data in a depth-time domain from an acoustic downhole tool disposed at a depth in the borehole, the acoustic downhole tool comprising an acoustic source and an acoustic receiver;
    transforming the acoustic data having waveform $w(z,t)$ where z is a depth of the acoustic receiver and t is time in the depth-time domain $\tilde{w}(p,\tau)$ into a Radon domain that is a function of p and tau ($\tau$) using a Radon transform where $\tilde{w}(p,\tau)=\int w(z,\tau+pz)dz$;
    filtering the acoustic data in the Radon domain to increase a signal of interest in the acoustic data in the Radon domain by removing unwanted signals in the Radon domain;
    determining a location of a point in the formation that reflected acoustic energy emitted from the acoustic source to the acoustic receiver, the location of the point being represented in the Radon domain; and
    inverting the location of the point represented in the Radon domain into a radius-depth, r-z, domain to image the formation, the depth being a distance into the borehole and the radius being a radial distance from the borehole.

18. The method according to claim 1, wherein inverting comprises using $w_f(r,z)=rho(\int \tilde{w}_f(p,t-pz)dp)$ where $\tilde{w}_f$ represents the acoustic data that is filtered in the Radon domain, $w_f$ represents the inverse Radon transform of the acoustic data, and rho( ) represents a rho filter to correct amplitude distortions.

19. The apparatus according to claim 8, wherein inverting comprises using $w_f(r,z)=rho(\int \tilde{w}_f(p,t-pz)dp)$ where $\tilde{w}_f$ represents the acoustic data that is filtered in the Radon domain, $w_f$ represents the inverse Radon transform of the acoustic data, and rho( ) represents a rho filter to correct amplitude distortions.

\* \* \* \* \*